United States Patent [19]

Kreitmeier

[11] Patent Number: 4,615,657

[45] Date of Patent: Oct. 7, 1986

[54] AIR STORAGE GAS TURBINE

[75] Inventor: Franz Kreitmeier, Baden, Switzerland

[73] Assignee: BBC Brown, Boveri & Company, Limited, Baden, Switzerland

[21] Appl. No.: 738,786

[22] Filed: May 29, 1985

[30] Foreign Application Priority Data

Jun. 30, 1984 [DE] Fed. Rep. of Germany ....... 3424138

[51] Int. Cl.$^4$ .............................................. F01D 3/00
[52] U.S. Cl. ................... 415/104; 415/144; 415/107
[58] Field of Search ............... 415/104, 105, 107, 96, 415/97, 144, 145

[56] References Cited

U.S. PATENT DOCUMENTS 1,344,193  6/1920  Wilson ................................ 415/107
1,885,512  11/1932 Cook et al. ......................... 415/107
4,214,436  7/1980  Romeyke et al. ................... 415/107

FOREIGN PATENT DOCUMENTS 62904  4/1982  Japan .............................. 415/170 R

*Primary Examiner*—Robert E. Garrett
*Assistant Examiner*—John Kwon
*Attorney, Agent, or Firm*—Burns, Doane, Swecker & Mathis

[57] ABSTRACT

An air storage gas turbine which, in the thermal part, comprises: a high pressure turbine with air inlet; a low pressure turbine with a rotor which requires cooling and a vane carrier; one high pressure balance piston and one low pressure balance piston located on a common shaft for the high pressure turbine and the low pressure turbine, respectively; and an impulse turbine being connected between the air inlet of the high pressure turbine and the consumers of low pressure auxiliary air.

9 Claims, 2 Drawing Figures

AIR STORAGE GAS TURBINE

FIELD OF INVENTION

The invention relates to air storage gas turbines generally and more particularly to air storage gas turbines having blade cooling and thrust balancing. The invention also concerns an operating method for an air storage gas turbine.

BACKGROUND OF THE INVENTION

Air storage gas turbines generally comprise a high pressure turbine with an air inlet, a low pressure turbine with a rotor requiring cooling and, in some cases, a vane carrier, together with one high pressure balance piston and one low pressure balance piston located on a common shaft for thrust balancing the high pressure turbine and the low pressure turbine, respectively.

In an installation designed in this manner, the high pressure balance piston and the low pressure balance piston are located adjacent to one another on the common shaft and are separated only by a balance piston intermediate space. The main part of the low pressure auxiliary air, which is required for cooling the low pressure turbine and for operating the low pressure balance piston, is taken from the high pressure balance piston. This air is, therefore, air originating from the high pressure intermediate space of the high pressure turbine which has been throttled by the sealing strips of the high pressure balance piston. In order to provide a sufficiently large quantity of auxiliary air, the labyrinth clearance in the high pressure balance piston must be made correspondingly large.

The arrangement mentioned above is associated with some shortcomings. The level of the auxiliary air pressure is generally dictated by the demands of the low pressure consumers and may, for example, be 13 bar however the pressure of the main pressure air in the high pressure intermediate space can be more than 40 bar (storage pressure). Accordingly, there are large throttling losses at the high pressure balance piston and the sealing strips of the latter are subject to a high aerodynamic load which can lead to vibration damage. In addition, it is absolutely necessary to provide pressure-controlled valves in order to compensate for mass flow changes caused by clearance changes at the high pressure balance piston. These valves are used either for blowing off low pressure auxiliary air or for introducing air from another source into the low pressure auxiliary air system. Also, the throttled air, being hot because the main high pressure air is generally preheated in a recuperator, can create high temperature stresses in the low pressure balance piston because of the convective heat transfer in the balance piston intermediate space.

OBJECT AND SUMMARY OF THE INVENTION

The object of the present invention is to condition the low pressure auxiliary air, in an air storage gas turbine of the aforementioned type, in a manner which avoids throttling losses and meets other energy considerations.

This object is obtained by the present invention wherein an impulse turbine with at least one stage is provided and is connected between the air inlet of the high pressure turbine and the low pressure auxiliary air consumers, in particular, the low pressure balance piston and the parts of the low pressure turbine requiring cooling.

The arrangement allows high pressure balance piston to be designed for the minimum possible quantity of leakage air so that further advantages are obtained. For example the aerodynamic loads on the sealing strips at the high pressure balance piston are rendered minimal and the influence of clearance variations in the labyrinth of the high pressure balance piston upon the condition of the low pressure auxiliary air practically disappears.

The present invention also provides an operating method for the provision of the low pressure auxiliary air when the air storage gas turbine is under load, wherein high pressure main air is branched off from the air inlet of the high pressure turbine and is led via an inlet line into an impusle turbine where it is expanded to the condition required by the low pressure auxiliary air consumers. Its main feature is that control technology measures are unnecessary.

BRIEF DESCRIPTION OF THE DRAWINGS

The subject matter of the invention is described below in more detail with reference to the drawing, wherein.

Figure 1:
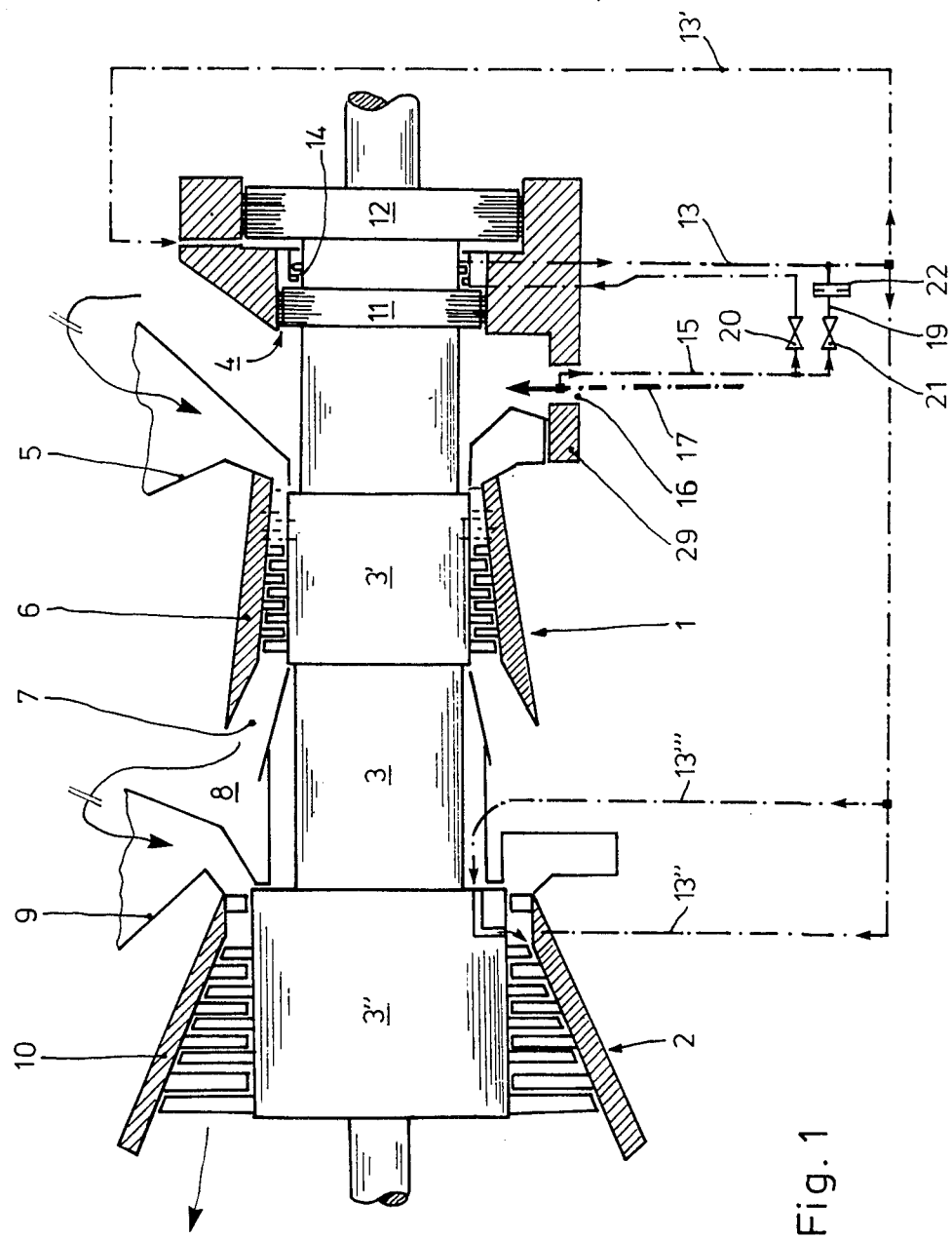
FIG. 1 is a longitudinal, sectional view of the thermal part of an air storage gas turbine constructed in accordance with a preferred embodiment of the present invention.

The drawing shows only those parts which are necessary for an understanding of the present invention including its method of operation. The direction of flow of the various media are indicated by arrows.

DETAILED DESCRIPTION OF THE PREFERRED EMBODIMENT

Referring to FIG. 1, an air storage gas turbine machine in accordance with the present invention comprises two partial turbines connected in series, with each partial turbine being provided with its own combustion chamber. The blading of the high pressure turbine 1 and that of the low pressure turbine 2 are seated on a common shaft 3 and the flow passes through them in the same direction.

The main air from the storage, which air may be preheated in a recuperator, passes via a main supply line 17 through the casing 29 into the high pressure intermediate space 4 of the high pressure turbine 1. From there, it flow into the high pressure combustion chamber, which is not shown but is located above the high pressure turbine. The hot gases pass via a high pressure hot gas casing 5 into the first partial turbine. The latter consists essentially of a high pressure rotor 3', fitted with rotor blades, and a high pressure vane carrier 6, provided with guide vanes. After giving up part of their energy to the rotor 3', the partially expanded gases leave the first partial turbine via the high pressure diffuser 7. Since the flow through both partial turbines is in the same direction, there is no necessity for transfer ducts and the gases from the diffuser 7 reach the low pressure intermediate space 8 directly. The gases are again heated in a low pressure combustion chamber located above the low pressure casing, which is not shown, and flow via the low pressure hot gas casing 9 into the second partial turbine. The latter consists essentially of a low pressure rotor 3", fitted with rotor blades, and a low pressure vane carrier 10, provided with guide vanes. After leaving the low pressure turbine 2, the expanded gases are, under certain circumstances, further used in a recuperator in which they give up their residual heat to the storage air.

The fact that the axial thrusts of the two partial turbines are additive demands a large thrust balance area. Since the two partial turbines can be run at different loads, each partial turbine is provided with its own piston for thrust balance purposes. A high pressure balance piston 11 and a low pressure balance piston 12 are therefore located at the end of the shaft. The high pressure balance piston 11 is supplied with high pressure air from the high pressure intermediate space 4; air at an appropriate condition is applied via a low pressure auxiliary air line 13' to the low pressure balance piston 12.

Further consumers of low pressure auxiliary air are the low pressure vane carrier 10 and the low pressure rotor 3'', both of which have to be cooled because of the very high gas temperatures at inlet to the low pressure turbine 2. Corresponding low pressure auxiliary air lines 13'' and 13''' lead to these consumers.

In accordance with the invention, the major part of the low pressure auxiliary air required, in particular for thrust balance and cooling purposes, is now prepared by means of an impulse turbine 14. This turbine is located on the common shaft 3 between the high pressure balance piston 11 and the low pressure balance piston 12. It is supplied via an inlet line 15 which branches off from the air inlet 16 of the high pressure turbine 1. The air, expanded to the desired condition and now referred to as low pressure auxiliary air, is supplied to the consumers via the low pressure auxiliary air line 13.

Figure 2:
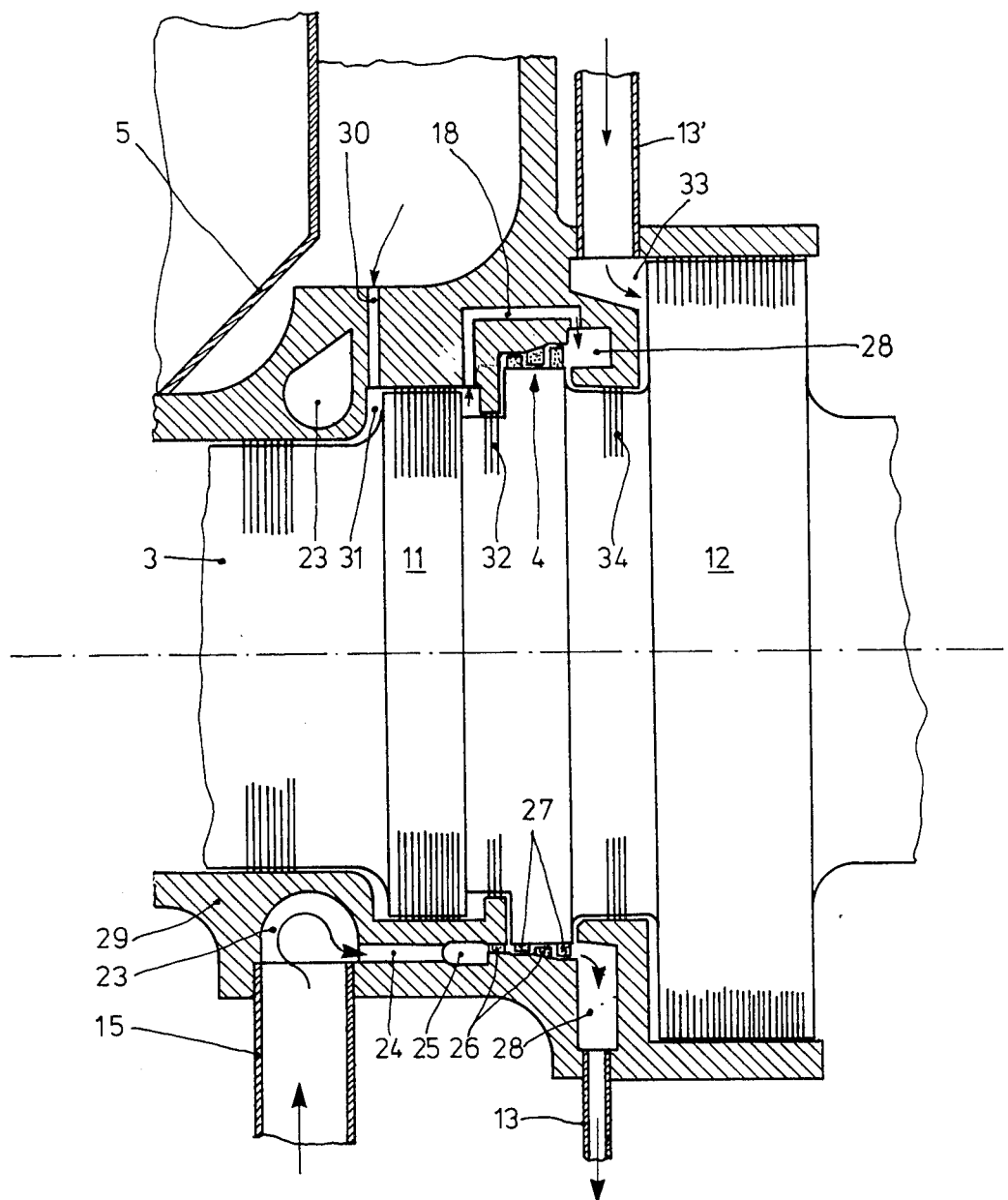
FIG. 2 is an enlarged sectional view of the high pressure side arrangement of the balance piston of FIG. 1.

Referring to FIG. 2, the leakage flow path from the high pressure balance piston 11 is shown in the upper half of the sectional view, whereas the feed to the impulse turbine 14 is mainly recognizable in the lower half.

Referring particularly to the bottom half of FIG. 2, high pressure air branched from the air inlet of the high pressure turbine is fed via the inlet line 15 into an annular chamber 23 in a casing 29 surrounding the shaft 3. The high pressure air passes via a multiplicity of peripherally located holes or slots 24 into an inlet chamber 25 and to the impulse turbine 14, which may have partial admission. Because of the pressure ratios existing—the pressure of the main air was quoted initially as being greater than 40 bar and that of the low pressure auxiliary air as being approximately 13 bar—the impulse turbine is designed as a classical Curtis stage with two guide vane rows 26 and two rotor blade rows 27. The full drop (pressure and temperature difference) between the high pressure main air system and the low pressure auxiliary air system is utilised in the Curtis stage. The expanded air flows via the outlet chamber 28 into the low pressure auxiliary air line 13.

Referring to the top half of FIG. 2, the high pressure air to which the high pressure balance piston 11 is subjected comes from the high pressure intermediate space 4. This air enters the space 31 via holes 30 located around the periphery of the casing 29, where it acts upon the balance piston upstream space 31. The seals on the piston 11 are so dimensioned that the smallest possible quantity of air flows through the labyrinth at the piston 11. This leakage air is led, in a bypass 18 directly at the outlet from the labyrinth at the piston 11, around the impulse of turbine 14. A labyrinth 32 prevents flow between the outlet of the piston 11 and the outlet of the first guide vane row 26 of the turbine 14. The bypass 18 is so dimensioned that the pressure across the labyrinth 32 is balanced at the nominal operating condition of the gas turbine. This arrangement provides the best possible efficiency of the Curtis stage. The bypass flow combines with the exhaust air from the turbine 14 in the outlet chamber 28.

Similarly, the low pressure auxiliary air line 13' feeds low pressure auxiliary air to the low pressure balance piston 12. This auxiliary air passes into the space 33, where it acts upon the balance piston upstream space 33. The space 33 is separated from the outlet chamber 28 by a barrier labyrinth 34.

Referring to FIG. 1, during starting conditions, the main air and hence the air feeding the impulse turbine 14 may be too cold. Due to the expansion in the Curtis stage, the temperature of the low pressure auxiliary air would drop to an unacceptably low level. In order to prevent this situation, the inlet line 15 can be shut off by a first valve 20. There is also provided a starting line or passage 19 with a second valve 21 located within it. This starting line 19 connects the inlet line 15 to the auxiliary air line 13. This arrangement allows the impulse turbine 14 to be bypassed. The swallowing capacity of the starting line 19 is matched to that of the turbine 14 by means of a throttle 22. The two valves 20 and 21 are preferably temperature-controlled, the temperature of the air branched off in the inlet line 15 upstream of the valves 20 and 21 being used as the control parameter.

By this arrangement, the switching process from starting line (19) to turbine operation (14) can be automated. If this switching process is to occur without any change to the mass flow of the low pressure auxiliary air, it is desirable that the two valves 20 and 21 should be oppositely connected in a suitable manner and that they should have equal percentage characteristics. During normal operating conditions, the valve 20 is fully open and the valve 21 is fully closed.

The disclosed configuration provides the following advantages:

that throttling losses from the sealing strips of the high pressure piston are substantially avoided when providing low pressure auxiliary air;

that temperature stresses in the low pressure balance piston 12 are minimal during starting conditions because the convective heat transfer is very small and the relevant temperature is low;

that the metering of the important mass flows in the low pressure auxiliary air system can take place with simple orifices, i.e. with fixed cross-sections. Transient effects are therefore substantially prevented and the use of control technology measures is rendered unnecessary.

The invention is not, of course, limited to the information shown and described. One possible difference is that the high pressure turbine does not need to be provided with a separate combustion chamber. In this case, the previous high pressure intermediate space 4 and the high pressure inlet casing 5 would become one single part. Furthermore, the impulse turbine 14 can be located without difficulty at another position on the shaft 3 or on a separate shaft altogether.

Accordingly, it is to be understood that the present invention may be embodied in other specific forms without departing from the spirit or essential characteristics of the present invention. The preferred embodiment is therefore to be considered illustrative and not restrictive. The scope of the invention is indicated by the appended claims rather than by the foregoing descriptions and all changes or variations which fall within the meaning and range of the claims are therefore intended to be embraced therein.

What is claimed is:

1. In an air storage gas turbine of the type including:
a high pressure turbine with an air inlet;
a low pressure turbine utilizing low pressure air for cooling; and
a high pressure balance piston and a low pressure balance piston, located on a common shaft for the high pressure turbine and the low pressure turbine, respectively; the improvement comprising an impulse turbine having an inlet and an outlet, first means for communicating said impulse turbine inlet with the air inlet of the high pressure turbine and second means for communicating said impulse turbine outlet with the low pressure balance piston and parts of the low pressure turbine.

2. The gas turbine according to claim 1, wherein the impulse turbine includes a Curtis stage with two guide vane rows and two rotor blade rows.

3. The gas turbine according to claim 1, wherein the impulse turbine is located on the common shaft of the high pressure turbine and the low pressure turbine.

4. The gas turbine according to claim 3, wherein the impulse turbine is located between the high pressure balance piston and the low pressure balance piston.

5. The gas turbine according to claim 1, further comprising means for communicating an inlet side of the high pressure balance piston with a high pressure intermediate space of the high pressure turbine and third means for communicating an outlet of the high pressure balance piston with said second communicating means, said second communicating means including a low pressure auxiliary air line.

6. The gas turbine according to claim 5, wherein said third communicating means includes a bypass around the impulse turbine.

7. The gas turbine according to claim 5, further comprising a passage which communicates the first communicating means with the low pressure auxiliary air line so as to bypass the impulse turbine, a first temperature-controlled valve being located in the first communicating means and a second temperature-controlled valve being located in the passage.

8. A method of providing low pressure auxiliary air during operation of an air storage gas turbine of the type including a high pressure turbine with an air inlet, a low pressure turbine utilizing low pressure air for cooling, a high pressure balance piston and a low pressure balance piston located on a common shaft for the high pressure turbine and the low pressure turbine, respectively, said method comprising the steps of delivering a branched off part of heated high pressure main air from the air inlet of the high pressure turbine to an impulse turbine, expanding the delivered air in the impulse turbine to the condition required for low pressure auxiliary air while giving up energy to the common shaft and supplying the expanded air through a low pressure auxiliary air line to the low pressure balance piston and parts of the low pressure turbine.

9. The method according to claim 8, further comprising the step of:
during starting of the air storage gas turbine, interrupting the delivery of the branched-off main air to the impulse turbine by closing a first temperature-controlled valve and delivering the branched-off main air to the low pressure auxiliary air line by opening a second temperature-controlled valve.

* * * * *